United States Patent
Gaves

(10) Patent No.: US 6,332,656 B1
(45) Date of Patent: Dec. 25, 2001

(54) DISPENSING AND STORAGE UNIT FOR DISCS AND THE LIKE

(76) Inventor: James W. Gaves, 274 Cedar Street, Chateauguay, Quebec (CA), J6J 5K3

(*) Notice: Subject to any disclaimer, the term of this patent is extended or adjusted under 35 U.S.C. 154(b) by 0 days.

(21) Appl. No.: 09/558,254

(22) Filed: Apr. 25, 2000

(51) Int. Cl.$^7$ .................................................. A47B 81/06
(52) U.S. Cl. ........................................ 312/9.14; 312/9.18
(58) Field of Search .............................. 312/9.3, 9.1, 9.9, 312/9.34, 9.43, 9.14; 211/41.12

(56) References Cited

U.S. PATENT DOCUMENTS

| | | |
|---|---|---|
| D. 323,931 | 2/1992 | Haynes . |
| D. 328,387 | 8/1992 | McFarland et al. . |
| D. 344,891 | 3/1994 | Dressen . |
| D. 371,917 | 7/1996 | Thomas . |
| D. 382,436 | 8/1997 | Goekler . |
| D. 394,182 | 5/1998 | Woolrich . |
| 4,664,454 | 5/1987 | Schatteman et al. . |
| 4,728,157 | 3/1988 | David, Jr. . |
| 4,770,474 | 9/1988 | Ackeret . |
| 4,779,732 | 10/1988 | Boehm et al. . |
| 4,817,799 | 4/1989 | Gregerson et al. . |
| 4,911,506 | 3/1990 | Stefan . |
| 5,039,178 | 8/1991 | Muenzer et al. . |
| 5,101,972 | 4/1992 | Hunt et al. . |
| 5,127,716 | 7/1992 | Caspers et al. . |
| 5,150,354 | 9/1992 | Iwata et al. . |
| 5,193,682 | 3/1993 | Naito et al. . |
| 5,244,084 | 9/1993 | Chan . |
| 5,275,480 | 1/1994 | Hyman et al. . |
| 5,332,086 | 7/1994 | Chuang . |
| 5,338,108 | 8/1994 | Hunt et al. . |
| 5,346,295 | 9/1994 | Richter . |
| 5,351,836 | 10/1994 | Mori et al. . |
| 5,503,470 | 4/1996 | Lu . |
| 5,515,979 | 5/1996 | Salvail . |
| 5,613,745 | 3/1997 | Cho et al. . |
| 5,617,950 | 4/1997 | Chung . |
| 5,683,153 | 11/1997 | Ohta . |
| 5,690,221 | 11/1997 | Yeh . |
| 5,704,494 | 1/1998 | Nishikiori et al. . |
| 5,720,387 | 2/1998 | Young . |
| 5,725,105 | 3/1998 | Boland . |
| 5,779,038 | 7/1998 | Herr et al. . |
| 5,782,348 | 7/1998 | Burdett . |
| 5,790,485 | 8/1998 | Bando . |
| 5,833,067 | 11/1998 | Joshi . |
| 5,842,563 | 12/1998 | Herr et al. . |
| 5,850,921 | 12/1998 | Shindou et al. . |
| 5,860,712 | 1/1999 | Nielsen . |
| 5,887,712 | 3/1999 | Jenkins et al. . |
| 5,912,779 | 6/1999 | Llewellyn et al. . |
| 5,956,310 | 9/1999 | DÁlayer de Costemore d Árc . |

*Primary Examiner*—Peter M. Cuomo
*Assistant Examiner*—Jerry A. Anderson

(57) ABSTRACT

A system for the storage and retrieval of discs (e.g., CDs, DVDs) and the like. An outer housing contains a tiltable inner housing having grooves on upper and lower walls for holding discs by their edges in a vertical orientation. A portal element, formed with a vertical slot for loading and retrieving discs, is movable across the front of the outer housing into alignment with individual disc positions of the inner housing. Flexible shutters are attached to the portal element, maintaining the entire front of the outer housing closed, except for the portal opening. The inner housing has a stable position, tilted slightly to the rear, causing the discs to roll to storage position at the back. A selected disc can be retrieved by tilting the inner housing forwardly, causing the discs to roll forwardly. All discs except the selected disc, aligned with the portal slot, are held back by the flexible shutter, while the selected disc is allowed to roll through the portal slot to an exposed retrieval position. Provision is also made for storing tray cards for retrieval along with discs associated therewith. The discs, which are contained in a compact, dust-free environment, are easily stored and retrieved. Direct indexing is enabled by a bottom hinged door panel provided with a plurality of angled surfaces for mounting title strips associated with the discs. By aligning the movable portal with a title strip, the corresponding disc may be retrieved.

26 Claims, 16 Drawing Sheets

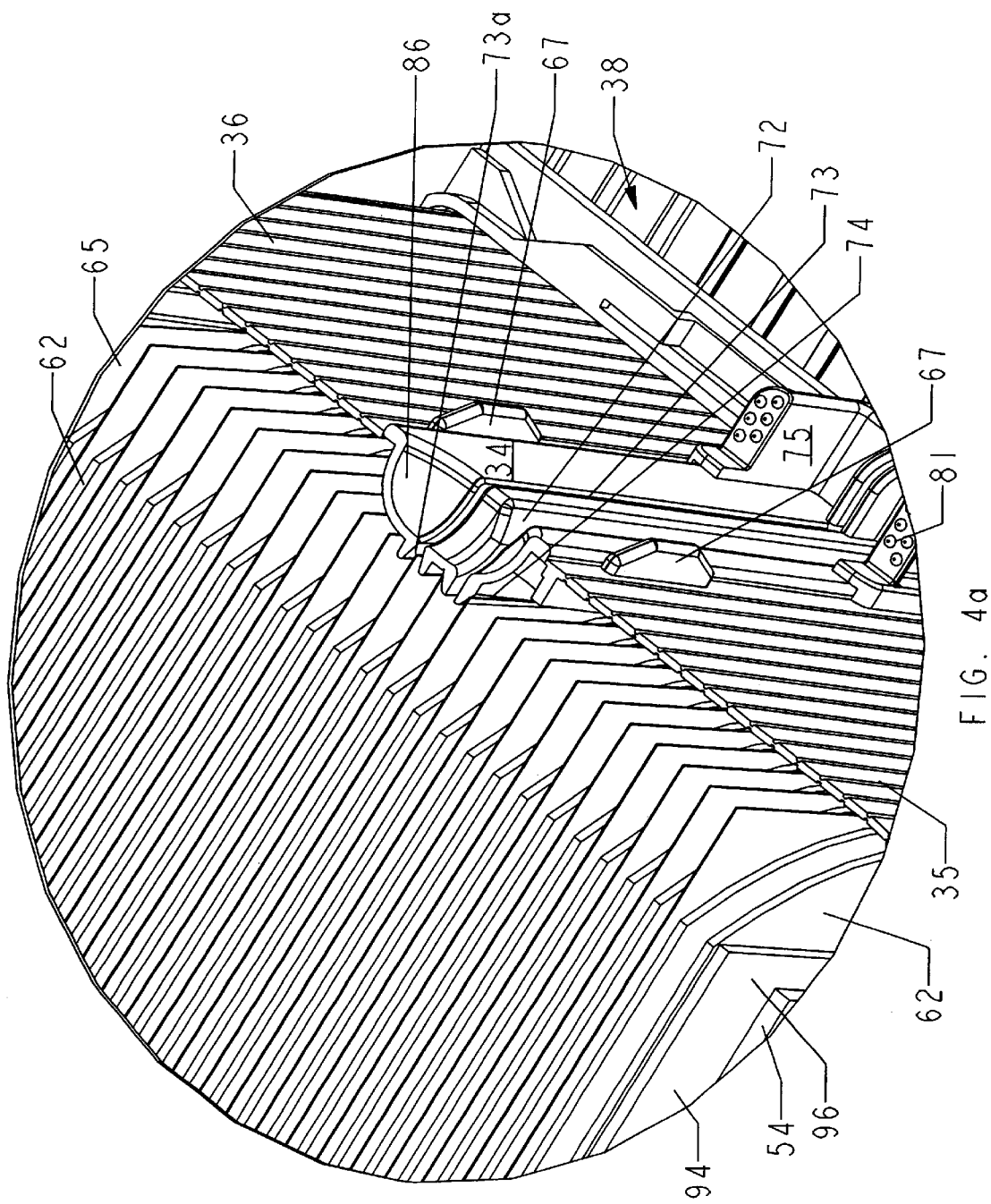

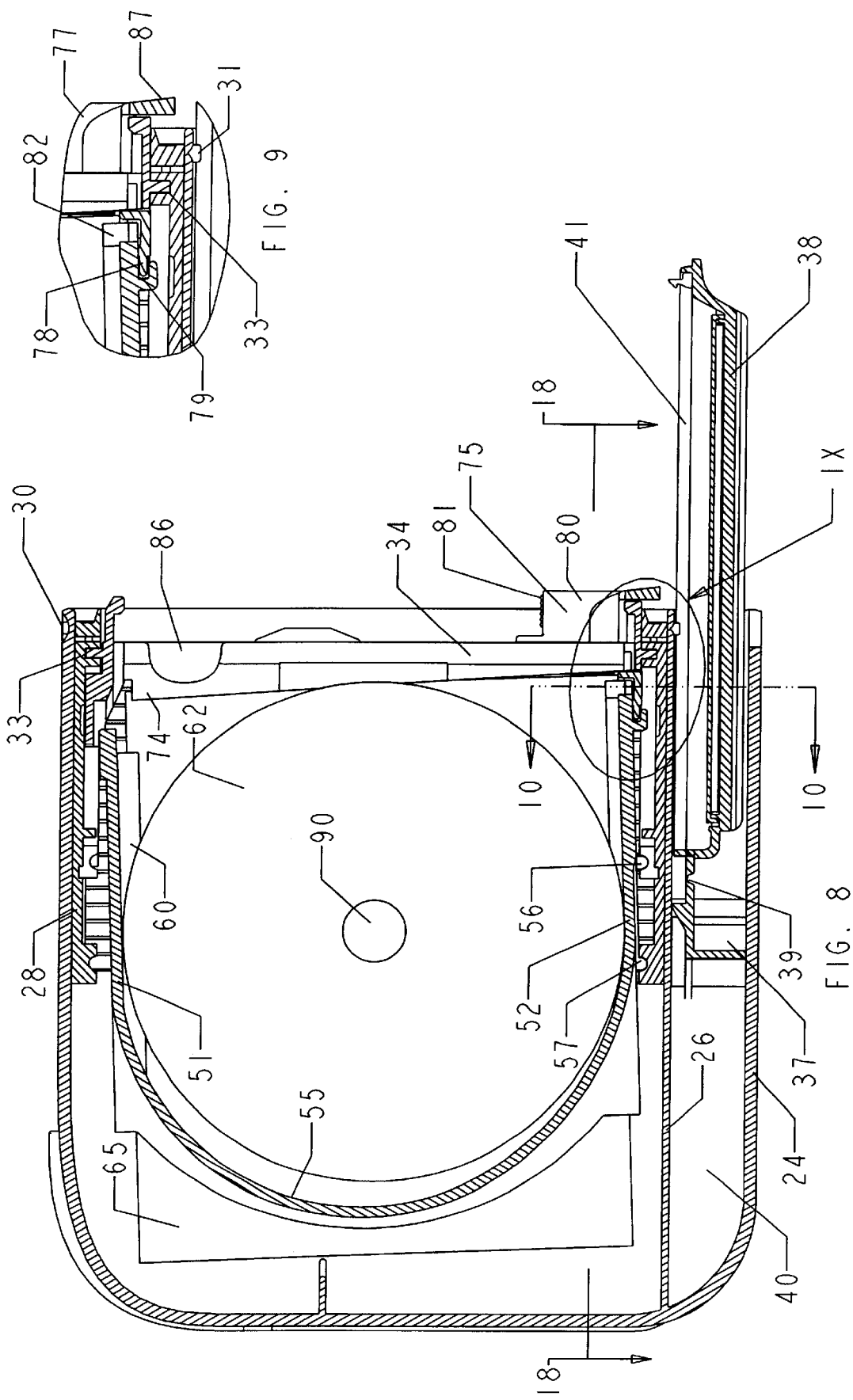

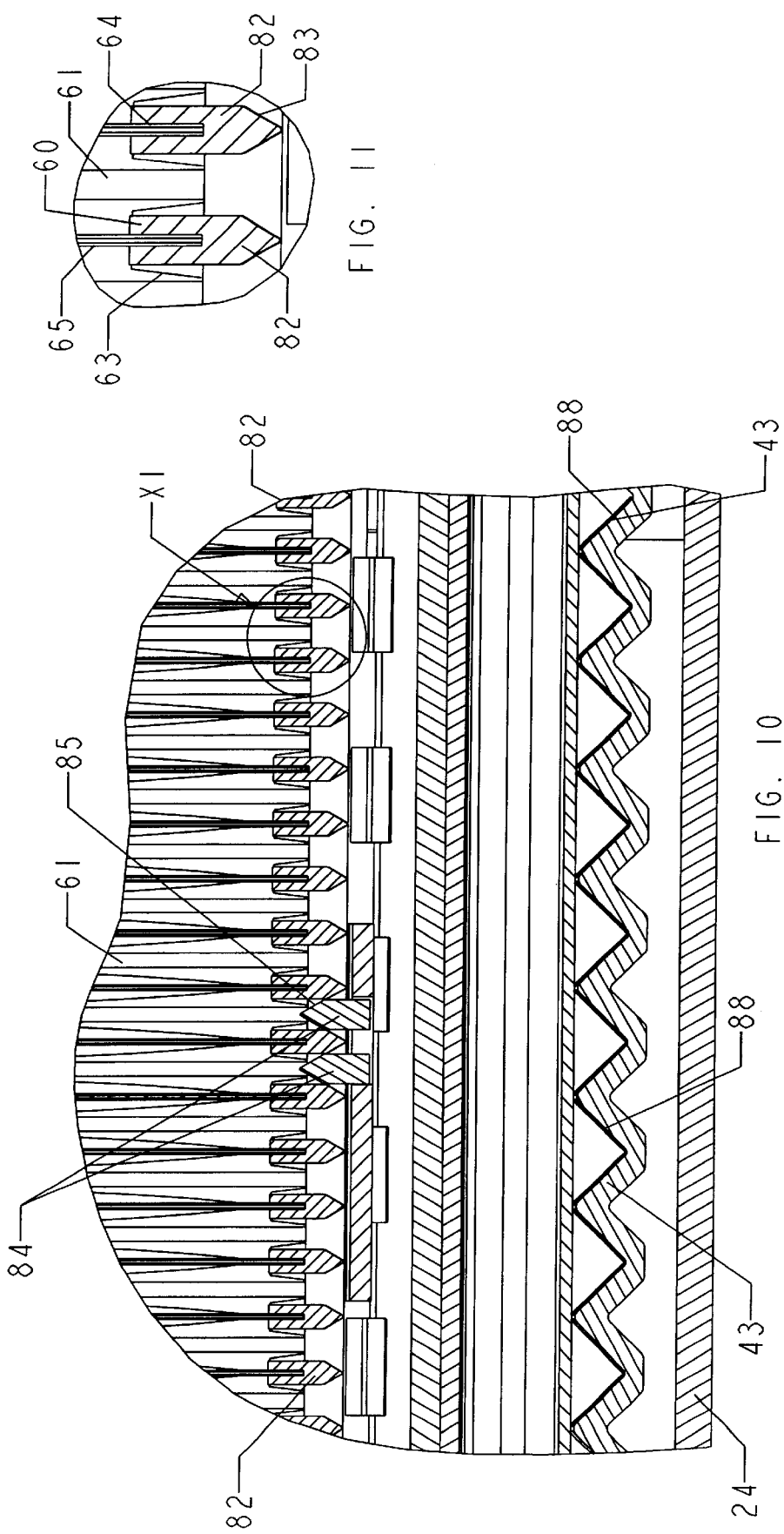

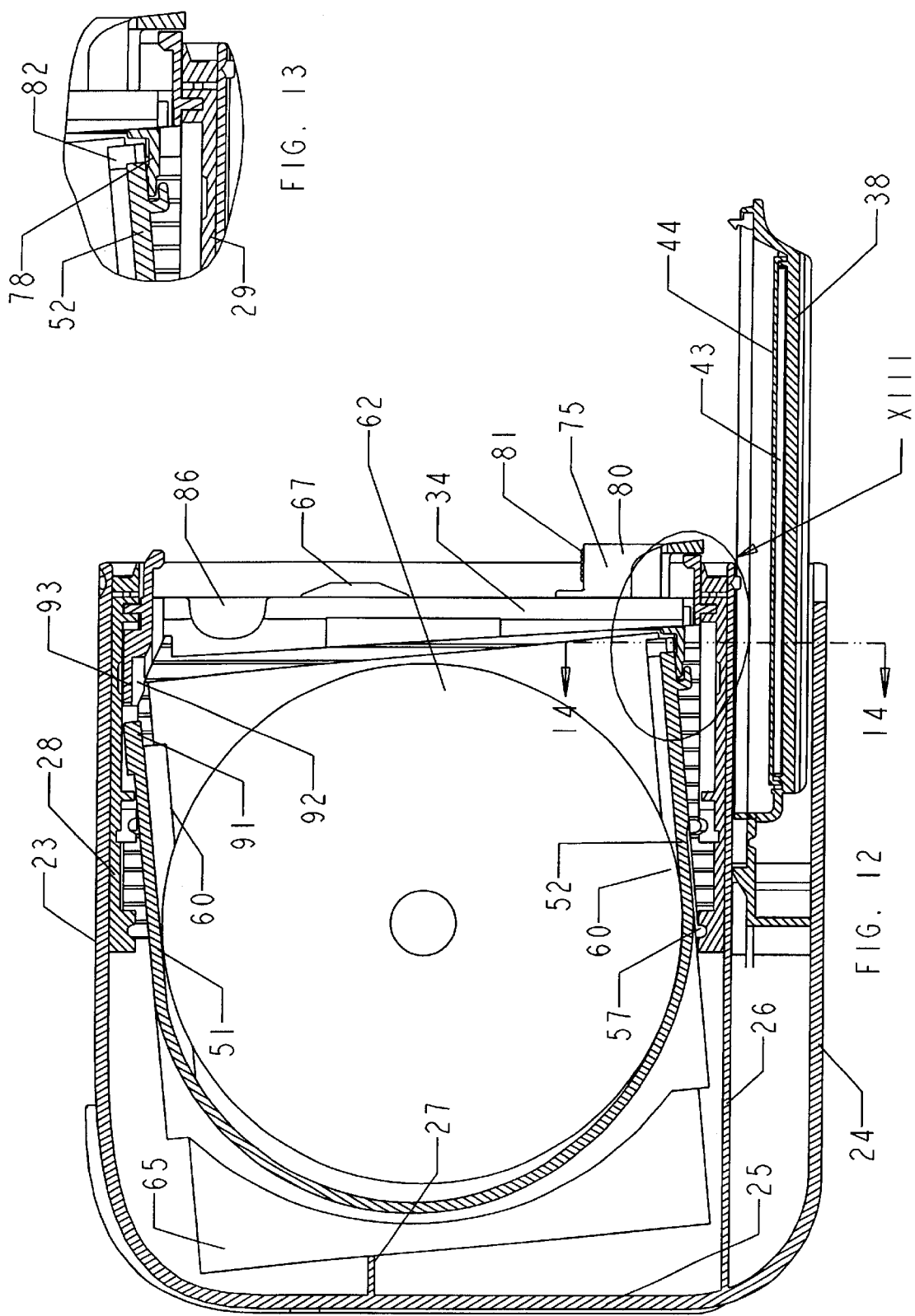

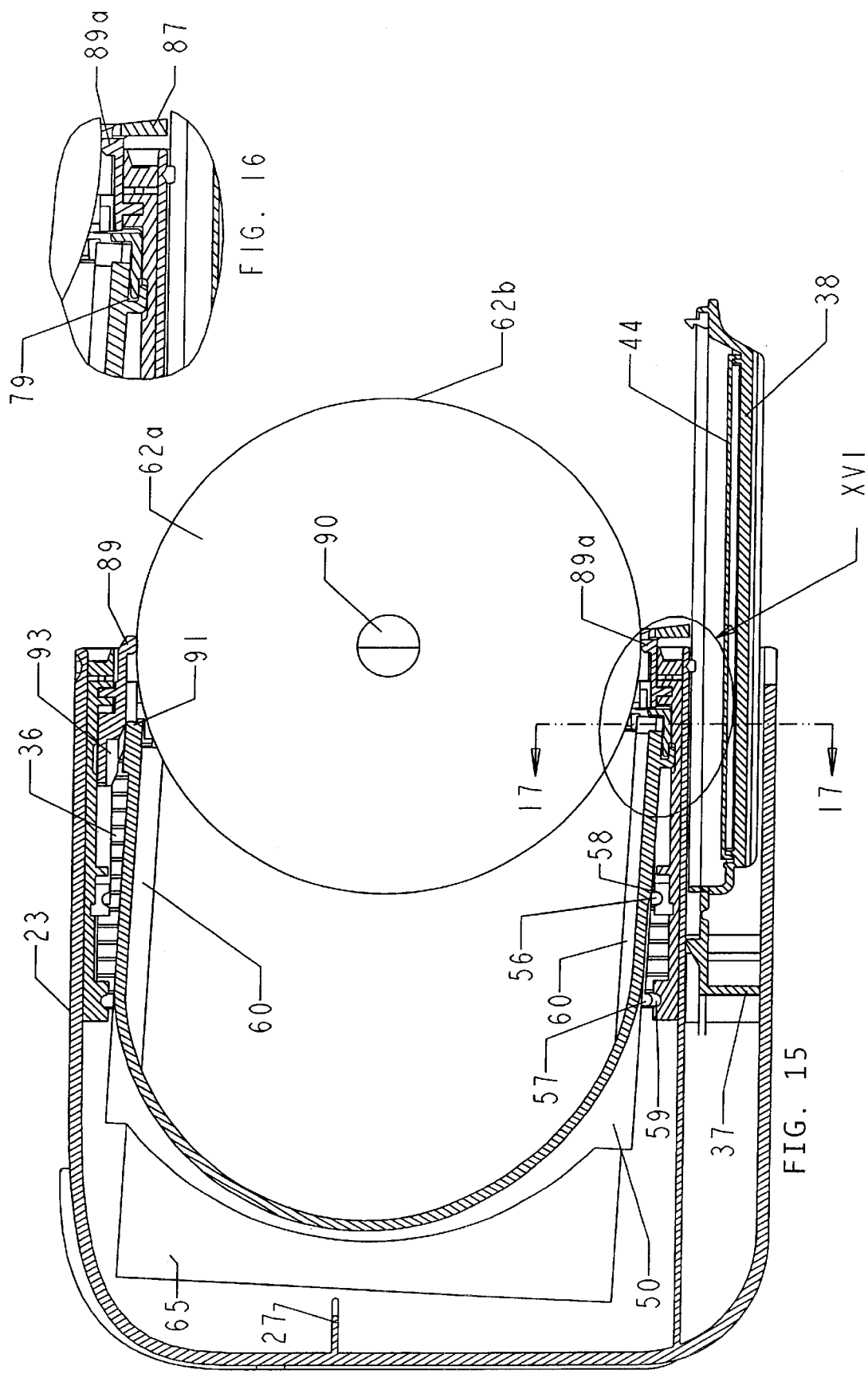

DISPENSING AND STORAGE UNIT FOR DISCS AND THE LIKE

FIELD OF THE INVENTION

The present invention is directed to the storage and retrieval of discs in particular, although the principles of the invention are applicable to the storage and retrieval of other items, such as cards, photos, floppy discs, etc.

BACKGROUND AND SUMMARY OF THE INVENTION

Optically readable discs, such as audio and video discs (CD, CD-R, CD-RW, DVD, DVD-R, DVD-RW), etc. are in widespread use, and there is a recognized need for suitable means for their convenient storage and retrieval. A variety of systems and devices have been proposed, all of which are subject to shortcomings and disadvantages.

Optical discs are typically marketed in so-called "jewel case" enclosures, which are flat boxes, typically of clear plastic material, that contain the disc together with a tray card and title strip carrying information relating to the contents of the disc, and sometimes a small information booklet. One of the most common storage techniques involves the use of storage racks for holding the discs in their original jewel cases. U.S. Pat. No. 5,117,984 is an example of one of many such racks. This approach to storage and retrieval has several significant disadvantages, one of which is the substantial space requirement involved in the storage of the disc in its relatively bulky jewel case. Collectors frequently may have several hundred discs to store, and the extra space required to accommodate a jewel case for each becomes significant. Additionally, retrieval of a particular disc requires, among other things, removal of the disc from the jewel case. This can be somewhat difficult, because the disc frequently is held in the case by a center hub structure, which offers resistance to the removal of the disc and eventually can lead to cracking of the disc's thin reflective foil and degradation of the disc. Aesthetics is another problem with this kind of storage. Typically, the storage racks store the jewel cases with one edge (bearing the title of the disc) exposed. This results in an uncoordinated, multi-color display that may conflict with the decor of the room. A less obvious, but nevertheless significant disadvantage of this storage technique is that the jewel cases have open areas (slots) and, if exposed to the ambient, provide only marginal dust protection to the optical discs, which can result in degradation of disc performance over time.

Another common approach to optical disc storage is reflected in U.S. Pat. No. 5,101,972, in which the discs are stored without their original jewel cases, by insertion in individual slots in a storage case. This arrangement has the obvious benefit of reducing space requirements. However, typically there is no convenient facility for the storage of tray cards and/or booklets. Retrieval of discs is rather cumbersome because, in the first instance, it is necessary to provide for indirect indexing. That is, the discs are accessed from the storage case by number, and it is necessary to have a separate index cross referencing the position number in the case to the title of the particular disc. When a particular disc is identified and selected, it is retrieved by opening the entire case, exposing all of the discs to the ambient and to the potential for dust contamination. Moreover, replacing the disc after use requires a reasonable level of dexterity, in order to insert the disc into its narrow slot.

Yet another form of storage device is represented by U.S. Pat. No. 5,785,399, which illustrates a portable clam shell-type case. This approach also stores the disc without its jewel case and makes efficient use of space. It is useful for portable storage devices, but is not particularly suitable for home storage systems due to limitations in the ability to stack multiple units. Indexing is also rather limited.

U.S. Pat. No. 4,911,506 discloses a storage case for storage of optical discs in closely spaced, side-by-side relation in a tiltable housing. Disc retrieval is effected by sliding a carrier to a desired position and tilting the housing to allow a selected disc to roll forwardly into the carrier. The selected disc is locked into the carrier, which is then moved laterally to one side or the other of the storage container, where slots are provided for enabling the disc to be removed from the container. Although lateral space is efficiently used, the use of space in the front-to-back direction is very inefficient. Loading and retrieval of discs is somewhat cumbersome, because of the need to first load the disc into the carrier and then to transport the carrier to the side of the container. Additionally, indexing is inconvenient.

It is an objective to the present invention to provide a novel and improved system for the storage and retrieval of optical discs in an effectively dust-proof environment, while providing advanced features for the convenient indexing, loading and retrieval of discs, and while making efficient use of available space. In a preferred form of the invention, provision is made for the storage of tray cards in association with the discs, with the tray cards being available for retrieval simultaneously with the discs.

One of the significant objectives of the invention is the provision of a storage and retrieval system for optical discs which while storing the discs in an effectively dust-proof environment, at the same time optimizes the ease with which discs may be loaded into and retrieved from the storage unit. This is accomplished by storage of the discs vertically, on edge, in a housing, which is closed except for a horizontally slidable portal element provided with a vertical access slot for loading and retrieval of discs. Flexible shutters are attached to each side of the sliding portal element such that, in any position of the portal, the storage unit is fully enclosed except for the access slot in the portal element. In the most preferred embodiment, a door is provided for totally closing the front of the storage container, such that the storage environment is completely dust free when closed up during periods of nonuse.

In a preferred form of the invention, an outer housing, open at the front, tiltably supports an inner housing provided with grooves for holding a plurality of discs vertically on edge. A laterally movable portal element is mounted for laterally slidable movement across the front of the outer housing into positions of selective alignment with grooves of the inner housing. The inner housing is normally tilted slightly to the rear, so that optical discs stored in its slots will tend to roll to stop positions at the back of the internal housing. Disc retrieval is effected by forward tilting of the internal housing to effect forward rolling of the discs. A selected disc, aligned with a vertical slot in the portal element, becomes exposed at the portal, to enable removal. All other discs are held back by the slidable shutter elements attached to each side of the portal.

A further objective of the invention is the provision of a disc storage and retrieval system which, in the retrieval mode, will present a disc with a substantial portion of its surface area, including the central opening, exposed. This enables the disc to be withdrawn from the storage container by grasping the center opening and an outside edge, without touching any of the sensitive surfaces of the disc. Reloading of the disc can be accomplished by gripping the disc in the same manner, while inserting the disc into the slot in the portal element. When the disc is partly inserted in its slot, the finger may be withdrawn from the center opening, and the disc can be pushed farther into the slot by contact with an edge only. Reinsertion of a disc is facilitated by providing the portal slot with an outwardly divergent V-shaped configuration, such that the leading edge of the disc is guided into its narrow retaining grooves in the inner housing. To particular advantage, the contours of the internal retaining grooves are such that the disc is engaged only at its outer edge extremities, in areas where data is not recorded.

In a particularly preferred form of the invention, provision is made for retaining tray cards in the storage housing in a position to be accessed simultaneously with access of the optical disc. Where such a feature is provided, the portal element is provided with a pair of adjacent vertical access slots, one for the disc and an adjacent slot for the tray card. Manipulation of the housing to present a disc at the access slot of the portal element for removal simultaneously presents the associated tray card in the adjacent slot for removal if desired. This particularly advantageous feature allows access to the tray card, containing important information about the contents of the disc, such as the names of songs and musicians, composers, arrangers, etc. that may be of interest to the collector.

An additional important feature of the present invention resides in the provision of a unique and advantageous direct indexing system which enables the portal element to be moved directly to a particular title rather than to a numeral index determined from a cross reference. In this respect, the inner side of the closure door for the storage unit is formed with a corrugated surface which, when the door is open, lies directly below the slidable portal element. The angled surfaces of the corrugated inner wall of the door have sufficient width, on the angle, to receive the title title strip, which is provided in the jewel case when the disc is initially purchased. Typically, the jewel case includes the tray card with title strips attached to opposite edges and visible at the spine of the jewel case. A title strip is separated from the tray card and mounted on an angular surface of the inner door wall, which angular surface corresponds with a particular slot location of the inner housing. Accordingly, a title strip, visible on the inner wall of the door, provides an indexing reference for the portal element. When the portal element is aligned with a given title, it will be aligned with a particular slot of the inner housing which will receive the disc corresponding to the title. By mounting the title strips at an angle, they remain fully visible to the user, while allowing the discs to be spaced closer together than the full flat width of the title strip. Thus, direct indexing of the discs is enabled while accommodating compact storage of the discs. In some embodiments, the entire title strip may be used. However, where more compact storage is desired, and only narrower spaces are afforded, it may be expedient to construct the inside of the door with two (or more) selectively visible, partial height panels, one slidable over the other, carrying shortened title strips. This enables the portal to be moved into alignment with a particular title strip of a selected panel, to provide direct indexing to the disc associated with the title strip.

As a further advantageous feature of the invention, provisions are made for automatically guiding the portal element into accurate alignment with a disc slot, after the portal element has been brought into visual alignment with a title strip and thus an approximate alignment with the corresponding slot in the housing.

Additional features and advantages of the invention will become apparent upon reference to the following detailed description of a preferred embodiment, and to the accompanying drawings.

DESCRIPTION OF THE DRAWINGS

FIG. 4a is an enlarged perspective view of the area IVa of FIG. 4

FIG. 8 is a cross sectional view as taken generally along line 8—8 of FIG. 2, showing the unit of the invention in a "rest" or "load" configuration.

FIG. 9 is an enlarged, fragmentary cross sectional view of the area IX of FIG. 8.

FIG. 10 is an enlarged, fragmentary cross sectional view as taken generally on line 10—10 of FIG. 8, illustrating details of the disc and card slots, and the means for alignment of the portal element.

FIG. 11 is a further enlarged, fragmentary view of the circled area identified by the numeral XI.

FIG. 12 is a cross sectional view similar to FIG. 8, illustrating the mechanism with the inner housing lifted at the front, in a "move" configuration to accommodate lateral sliding movement of the portal element for indexing to a new disc position.

FIG. 13 is a further enlarged, fragmentary illustration of the encircled area identified by the numeral XIII.

FIG. 15 is a cross sectional view similar to FIG. 8, showing the internal housing tilted forwardly in a "retrieve" configuration, for the ejection and removal of a selected disc and/or tray card.

FIG. 16 is an enlarged fragmentary illustration of the encircled area identified by the numeral XVI.

DESCRIPTION OF PREFERRED EMBODIMENTS

Figure 1:
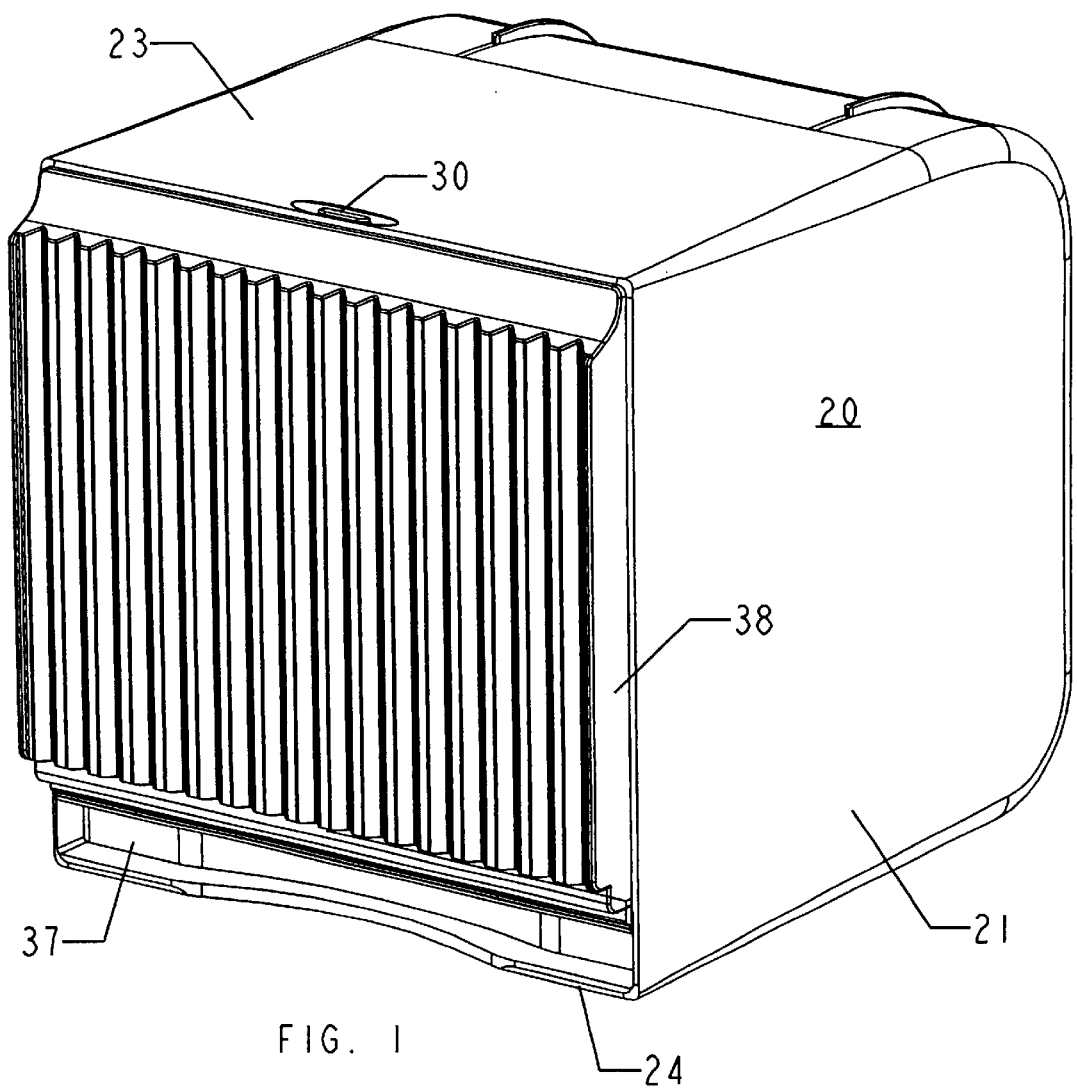
FIG. 1 is a perspective view of one preferred form of storage and retrieval unit according to the invention.

Referring now to the drawings, the reference numeral 20 designates generally an outer housing, which preferably is a unitary plastic molding, formed with opposite side walls 21, 22, top and bottom walls 23, 24 and back wall 25. The housing is provided internally with a platform wall 26 spaced a predetermined distance above the bottom wall 24 and an abutment flange 27 extending across the back wall 25. The front of the external housing is open.

Mounted internally of the housing 20, against the upper wall 23 and on the top surface of the platform wall 26, are guide panels 28, 29. For convenience of manufacture, these panels may be of identical construction, although they have slightly different performance requirements. The opposite side walls 21, 22 of the housing may receive opposite side edges of the guide panels in close fitting relation, as shown for example in FIG. 8. Each of the guide panels carries a depressible locking button 30, 31. The locking button 30 of the upper panel locks into an opening 32 in the front edge of the housing top wall 23, when the panel 28 is fully inserted into its working position within the housing, to lock the panel 28 in position. In a similar manner, an opening (not shown) in the platform 26 receives the locking button 31, to secure the lower guide panel 29 in its assembled position. The side walls 21, 22 may be provided with grooves (not shown) for engaging side edges of the guide panels, but this is considered to be not required because the panels are held in place by the presence of flexible shutters, to be described.

As will be described more completely hereinafter, the guide panels 28, 29 define upper and lower guide channels 33 for the reception and lateral sliding movement of a portal element 34 and flexible shutters 35, 36. These form an internal closure for the front of the housing 20.

In the illustrated and preferred embodiment of the invention, there is also an external closure door arrangement for the housing 20. Preferably, this is comprised of a hinge base 37 joined to a door panel 38 by a flexible living hinge 39. The hinge base 37 is slidably received in the space between the housing bottom 24 and the internal platform 26. While being freely slidable in front and back directions, within the space 40, the hinge base is normally retained within that space by the lower locking button 31.

The dimensions of the door panel 38 are such as to allow the door, when pivoted to an open position, to be partially received within the bottom space 40, as is evident in several of the drawing figures. This enables the door to be firmly supported in a horizontal position when the housing 20 is open. In order to fully close the housing, the door assembly is pulled outward, and the door panel 38 is pivoted upwardly about the flexible hinge 39. Desirably, the door panel has a peripheral flange 41, which is snugly received, within surrounding walls of the housing, such that, when the door is closed, the entire housing is effectively sealed against dust and other environmental contaminants. The upper locking button 30 serves also to secure a front door panel, engaging a latch 30a on the top of the door panel.

To great advantage, the internal surface 42 of the door panel is comprised of successive angularity related surfaces 43. These are disposed at an angle of, for example, 45° to a horizontal plane (when the door panel is in a horizontal position) forming a sharply corrugated or washboard surface. Each of the angular surfaces has a width dimension corresponding to a width of a title strip typically provided in the spine of the jewel case of a musical CD, for example, when the CD is marketed. The closure door of the illustrated device enables these title strips (or manually prepared title strips) to be mounted on the angular internal surfaces of the door. This enables direct reference to a particular disc, by reference to its title strip which is visible on the opened door. At the same time, the discs may be stored in a lateral space, which is significantly less than the width of a jewel case, for example. Desirably, the inner surface 42 of the door panel is covered by a panel 44 of clear plastic material to protect the title strips and retain them in place.

Pursuant to the invention, a tiltable internal housing 50 is received within the external housing 20. The internal housing is formed with top and bottom walls 51, 52, outer side walls 53, 54, and a preferably curved back wall 55. The front of the internal housing is open. The bottom wall 52 of the inner housing is formed with downwardly projecting front and back support ribs 56, 57 which extend transversely of the inner housing and are received within transverse grooves 58, 59 of the lower guide plate 29.

The overall width of the internal housing 50 is slightly narrower than the internal width dimension of the outer housing 20, providing a clearance space at each side for reception of the shutters 35, 36, as will be further described. When the internal housing is positioned within the external housing, it is both supported and centered by the grooves 58, 59. The specific arrangement of the grooves 58, 59, and the support ribs 56, 57 that are received therein, is such that the internal housing 50 is normally supported with a slight backward tilt, preferably of about two degrees, serving to cause discs, contained within the internal housing, to roll gently toward the rear by gravity. As will be further described, the internal housing can be caused to tilt further to the rear by lifting the front of the housing, causing it to pivot about the rear support rib 57, and also to tilt in a forward direction by depressing the front of the housing, causing it to pivot about the front support rib 56.

In a preferred embodiment of the invention, the tiltable internal housing is provided on its upper and lower walls with a plurality of closely spaced internal ribs 60 which extend from front to back in the housing and define disc receiving grooves 61 therein. The ribs 60, which may be about an eight of an inch in height, are arranged in vertically aligned pairs, forming vertically aligned upper and lower grooves 61 for the reception of upper and lower edge margins of an optical disc 62. Preferably, the side walls of the ribs 60 are tapered, as shown for example at 63 in FIG. 11, such that the ribs make contact with the optical disc only at the outermost edge extremities, where no data are recorded. To advantage, each of the ribs 60 is formed with a slot 64 suitable for the reception of tray card 65 as typically provided in the jewel case when an optical disc is marketed.

It will be understood that the grooves may in appropriate cases extend only from the bottom upward, or from the top downward, or they may be of full height. The optimum configuration will depend upon the particular items being stored. For optical discs, shallow top and bottom grooves may be preferred, whereas for floppy discs somewhat deeper grooves, extending from either top or bottom, may be suitable.

In the contemplated operation of the system of the invention, each of the grooves 61 can receive an optical disc, and each of the adjacent slots 64 can receive a tray card associated with one of the discs. As reflected in FIG. 8, the back wall of the internal housing advantageously is curved to correspond somewhat with the contours of the disc 62. The tray cards 65, however, typically are of square configuration. Accordingly, the back wall 55 of the internal housing is formed with slots 64a, aligned with the tray card slots 64, in order to allow rear portions of the tray card 65 to project beyond the back wall of the housing. The slots 64a advantageously are of forwardly divergent configuration to facilitate entry of the tray cards, which are not always perfectly flat. As will be understood, causing the tray cards to pass through vertical slots at the back of the housing helps to keep the sometimes flimsy cards in a flat plane for ease of storage and retrieval.

Figure 2:
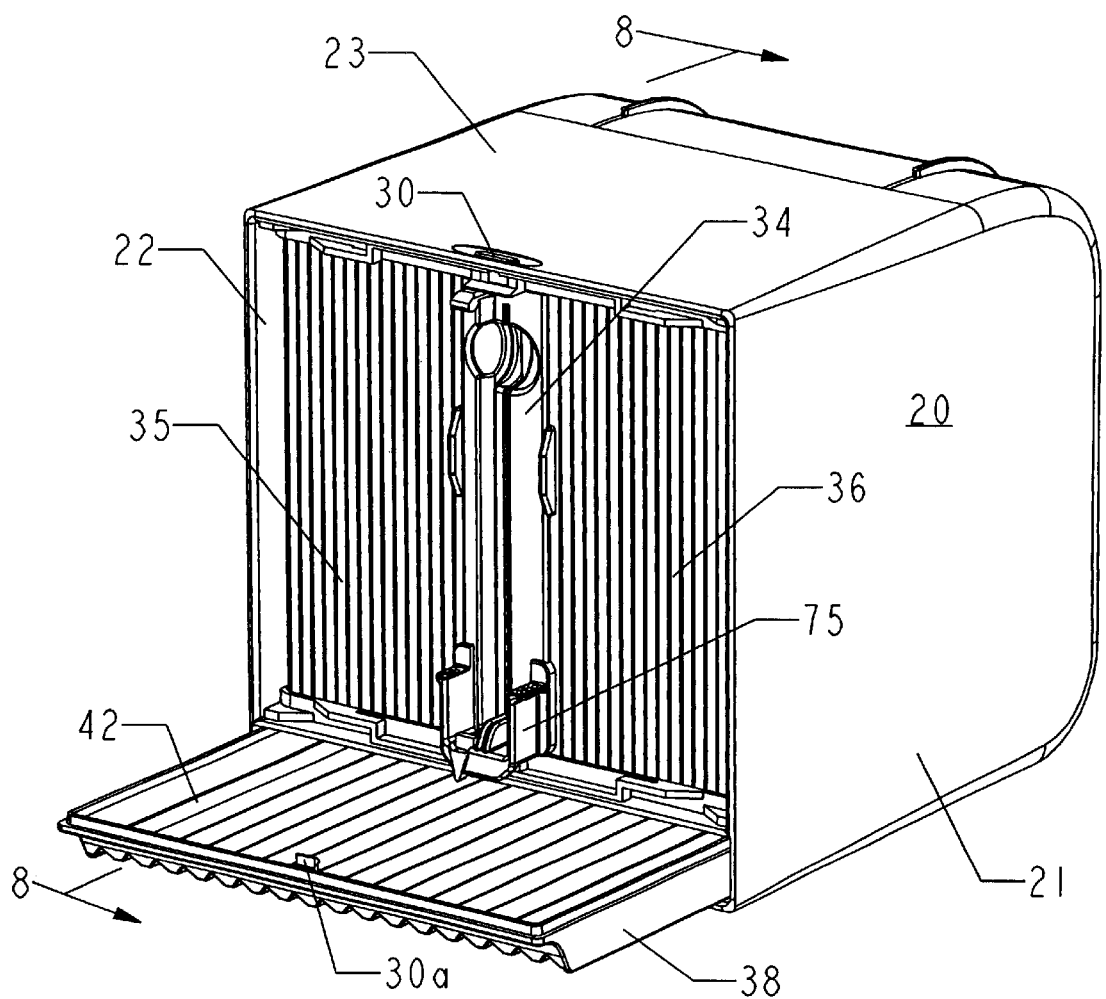
FIG. 2 is a perspective view, similar to FIG. 1, showing the unit with its access door in an open position.
Figure 7:
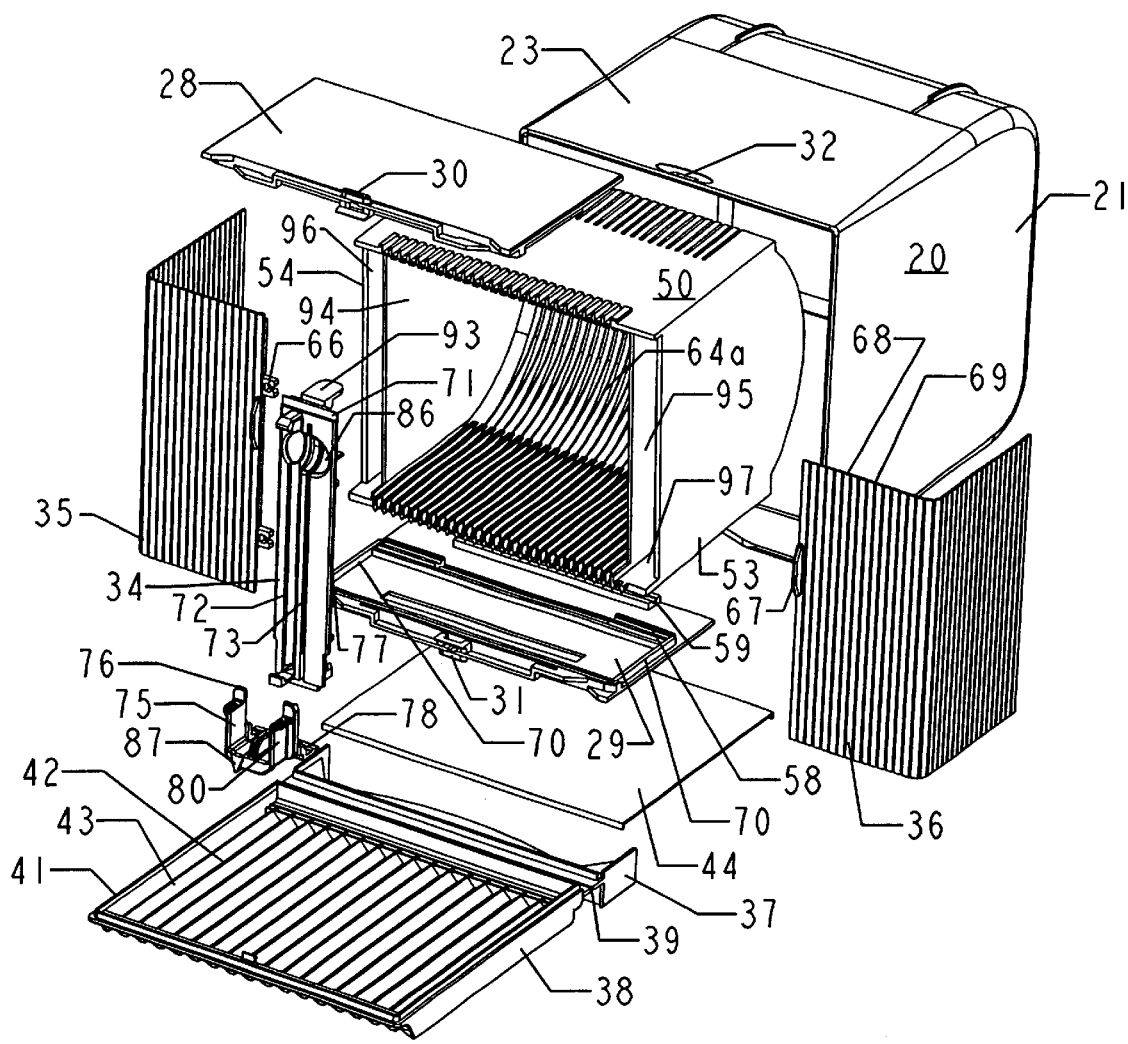
FIG. 7 is an exploded view showing the individual component parts of the storage and retrieval unit of FIG. 1.

As indicated in FIG. 2, for example, when the door panel 38 is opened, the front of the tiltable internal housing 50 remains effectively closed by means of the portal element 34 and the shutters 35, 36 on opposite sides thereof. Desirably, both of the shutters 35, 36 are removably attached to opposite sides of the portal element, by clips 66 (FIG. 7), which enable the shutters to be separated from the portal element when desired, gripping elements 67 being provided to facilitate such separation and later reattachment. The shutters 35, 36 preferably are formed of a molded plastic material, comprising relatively rigid, narrow, vertically oriented slats 68 joined together by integral living hinge elements 69. The upper and lower edges of the shutters are guided in the grooves 33 of the guide plates 28, 29. The flexibility of the shutters enables them to turn a tight corner at the side edges of the guide plates, being guided between flanges 70 of the guide plates and the side walls 21, 22 of the outer housing 20. The portal element 34 itself has upper and lower projecting flanges 71 which are received in the guide grooves 33 for lateral sliding movement across the front face of the external housing along with the shutters.

Pursuant to the invention, the portal element 34 is slidable into various positions in alignment with selected discs held in the internal tiltable housing. As the portal element is moved laterally, it draws one of the shutter elements 35, 36 behind it and pushes the other ahead of it, keeping the front face of the housing 20 at all times effectively covered.

In the preferred and illustrated embodiment of the invention, the portal element 34 is provided with a pair of side-by-side vertical slots 72, 73 for the passage of optical discs 62 and tray cards 65 respectively. The disc slot 72, as will be described, is movable into alignment with a selected disc groove 61 in the tiltable internal housing, to enable loading into or retrieval from the slot of an optical disc. When the portal element is positioned in alignment with a disc-retaining groove, the tray card slot 73 is also in alignment with a related set of tray card slots 64, 64a provided by the tiltable housing. Thus, when the portal element is aligned for loading or retrieval of a disc, it is also aligned for loading or retrievable of a tray card associated with that disc. In the illustrated embodiment, because the discs and tray cards are stored in a highly compact manner within the tiltable inner housing, the tray card slot 73 is preferably not aligned with the tray card slot immediately adjacent to the associated disc groove, but with a slot which is one position removed. This allows the respective slots 72, 73 to be spaced a more reasonable distance apart on the portal element 34.

Figure 4:
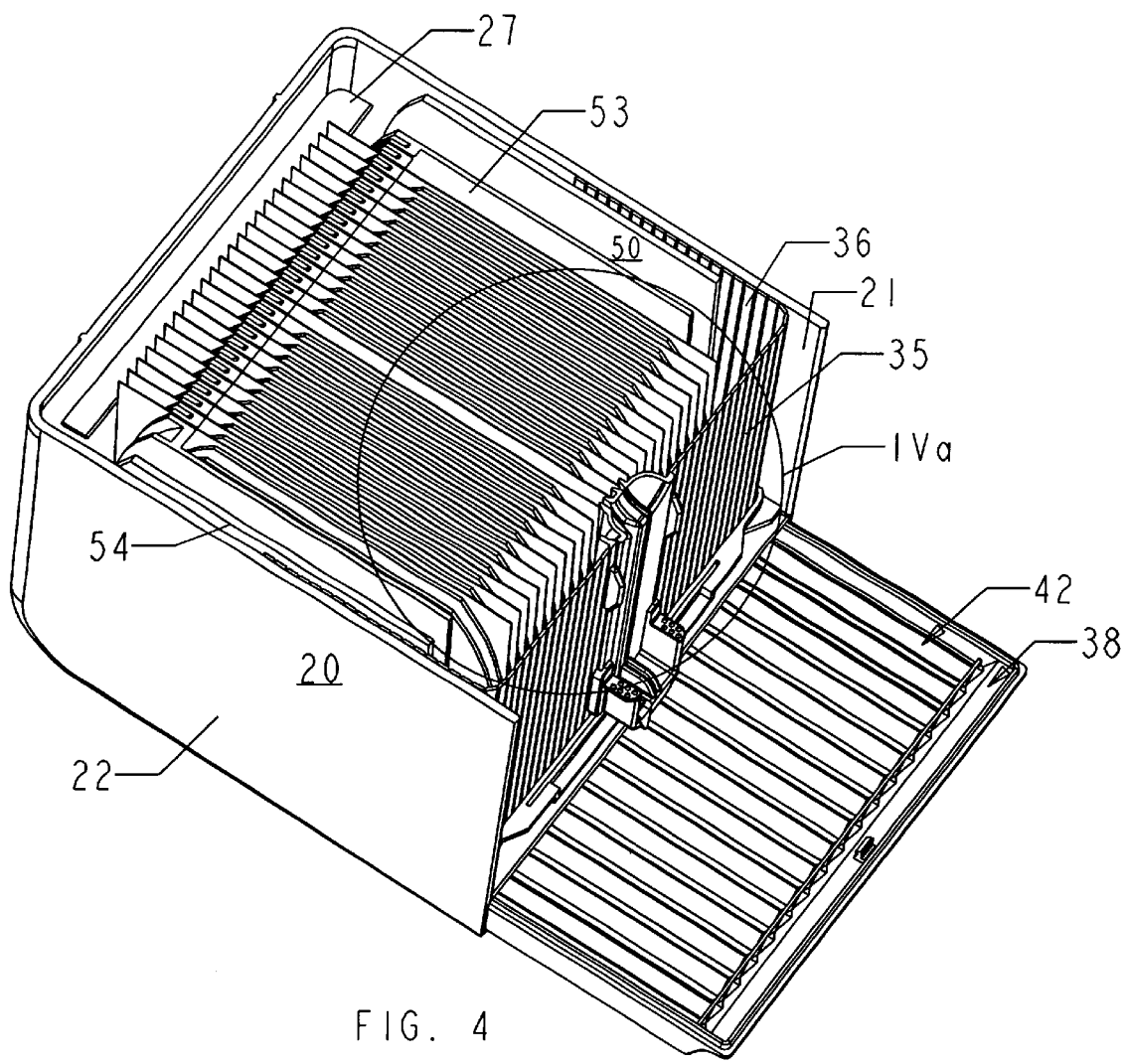
FIG. 4 is a top perspective cross sectional view of the unit as shown in FIG. 2, with the upper portion cut away to show details.
Figure 5:
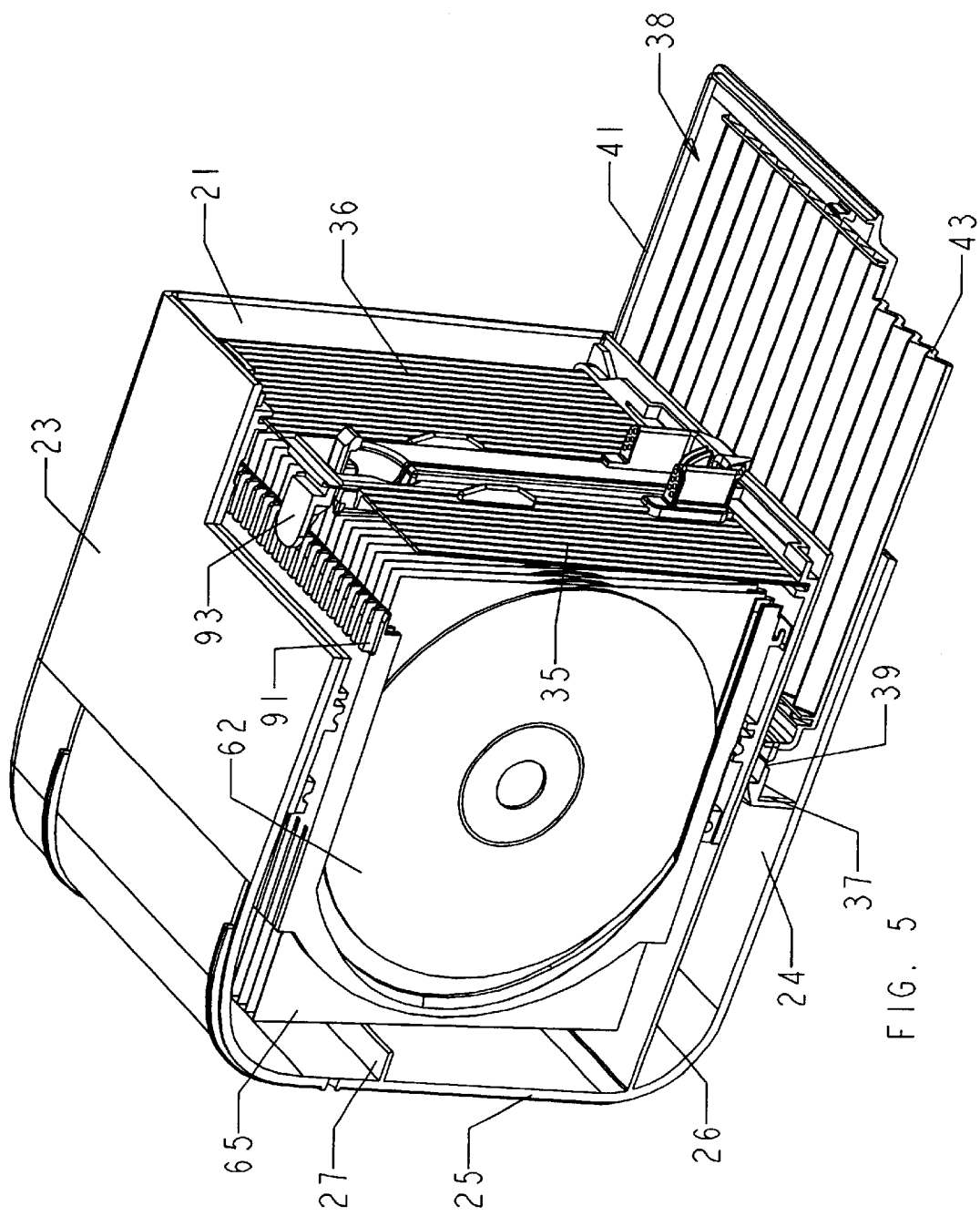
FIG. 5 is a perspective view of the unit, with parts broken away, to illustrate details of construction.
Figure 6:
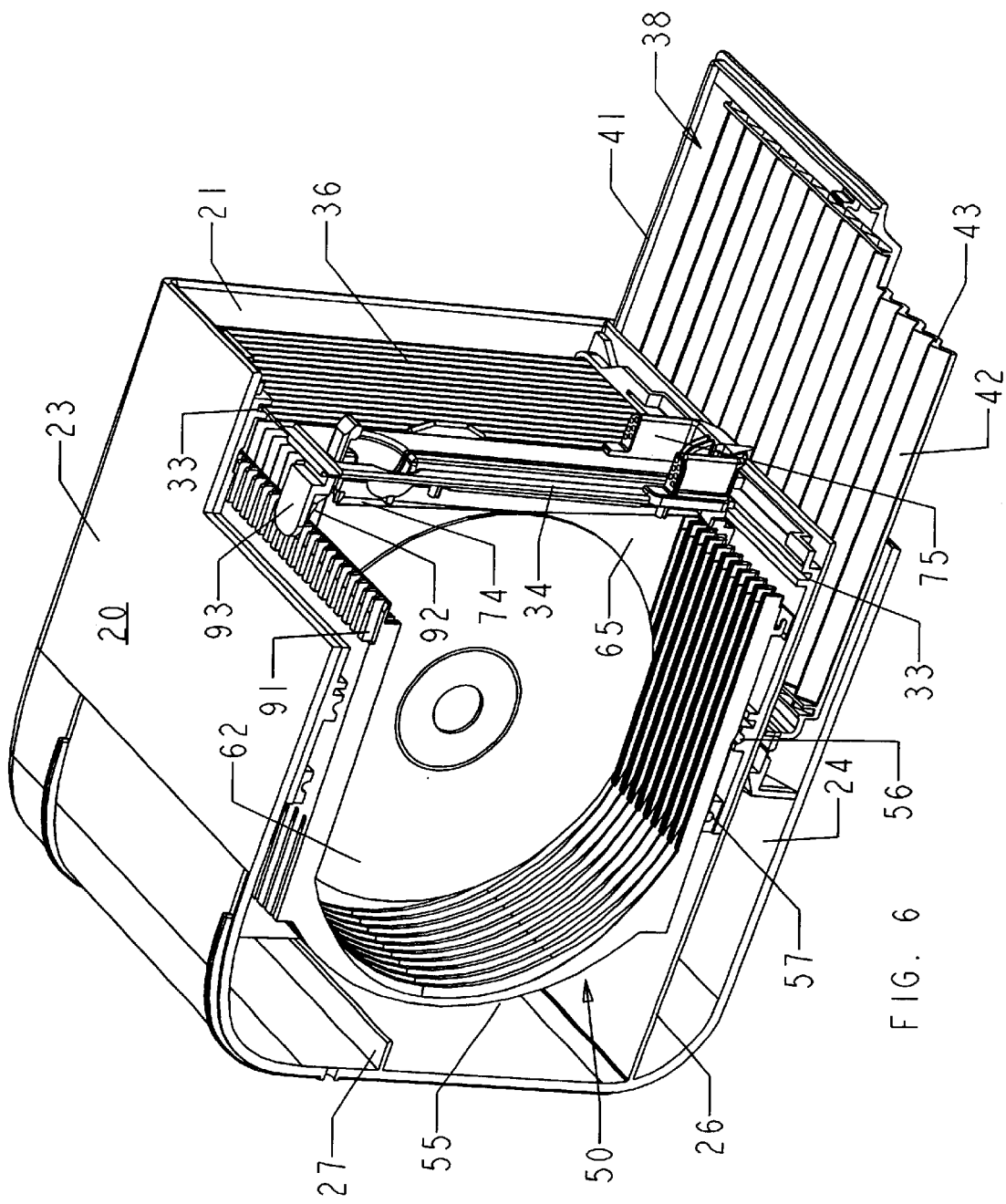
FIG. 6 is a view similar to FIG. 5, with parts broken away to show additional details.

Both of the portal slots 72, 73 are outwardly divergent, in order to facilitate entry of a disc or tray card for loading purposes. In addition, at least the upper portion of the tray card slot 73 has an inwardly divergent portion 73a (FIG. 4a), at the back of the portal element, to facilitate entry of the leading edge of a tray card during retrieval. In this respect, it will be understood that the paper tray cards may tend to get somewhat dog-eared with use, and the inwardly divergent slot portion 73a at the back facilitates entry of the leading edge of a card when retrieval is desired.

To advantage, the disc slot extends through a rearwardly projecting flange 74 (FIG. 4a) the outside surfaces of which are tapered and rearwardly convergent at least in the upper portions thereof. When the inner housing 50 is tilted forwardly, as will be explained hereinafter, the leading edges of all of the tray cards move forwardly with respect to the portal element 34, which is stationary in the outer housing. With this relative motion, the upper portion of the leading edge of the selected tray card is guided into upper portions of the card slot 73. Tray cards immediately adjacent and on either side of the disc slot 72 are diverted, if necessary, by the convergently tapered outer surfaces of the projection 74. Normally, this should not be necessary, except for the fact that the tray cards are rather fragile and may become damaged through usage such that the leading edges of the cards may tend to assume positions bent slightly off to one side or the other of the desired storage plane.

In the preferred and illustrated form of the invention, a slidable portal grip 75, formed with opposed guide channels 76, is arranged for vertical sliding engagement with opposite side edges 77 of the portal element 34. The portal grip 75 is provided with a rearwardly projecting tongue 78 arranged to be received in a forwardly facing transverse groove 79 provided under the bottom wall 52 of the tiltable inner housing. See FIG. 9, for example. The portal grip is provided with opposed gripping surfaces 80 at opposite sides thereof, by which the grip may be engaged and moved upwardly along the portal element 34, which serves to lift the front edge of the inner housing and tilt the housing rearwardly about its back support rib 57 to a position as shown in FIG. 12, in which the inner housing has a rearward tilt of about 5.5 degrees. The portal grip also has upwardly facing pads 81 at each side, which may be pressed downward, causing the portal grip to slide downward relative to the portal element 34. By reason of the engagement of the tongue 78 in the channel 79, pressing downward on either of the pads 81 will cause the front edge of the tiltable inner housing to be depressed, tilting the housing about its forward support rib 56, to a position as shown in FIG. 15, with an approximate three degree forward tilt.

To particular advantage, the portal element 34 and the tiltable inner housing 50 are provided with means for effecting a precise alignment of the portal element with a selected set of disc grooves in the housing. To this end, the forward ends of the lower ribs 60 project forward, beyond the front edge of the inner housing bottom wall 52 to form alignment lugs 82. These guide lugs are formed with V-shaped bottom edges 83. The portal element 34 in turn is provided with a pair of rearwardly projecting alignment lugs 84 (FIG. 10) provided with inverted V-shaped upper surfaces 85 which are received snugly between adjacent pairs of the alignment lugs 82 of the housing.

FIG. 10 illustrates details of the system of the invention with the tiltable inner housing in its stable at-rest position, as shown in FIG. 8. In that position, the portal alignment lugs 84 are partially received in the spaces between three adjacent alignment lugs 82 of the housing. In this relationship, the disc slot 72 of the portal element is accurately aligned with a specific disc groove 61 of the inner housing. Likewise, the card slot 73 of the e portal element is precisely aligned with a selected card slot 64 of the inner housing. In this fixed position of the portal element, a selected disc and/or a selected card may be loaded and/or removed from the inner housing. Loading of either a disc or a card is effected by simply inserting it through the appropriate slot. A disc, when inserted sufficiently far through the portal slot 72, will roll to the back of the inner housing, by reason of the rearward tilt of the housing in its stable position, shown in FIG. 8. A tray card is pushed manually into its slot. In this respect, the upper portion of the portal element has a recess 86 therein such that a tray card can be pushed deep into its storage position in t he slot 64.

Figure 14:
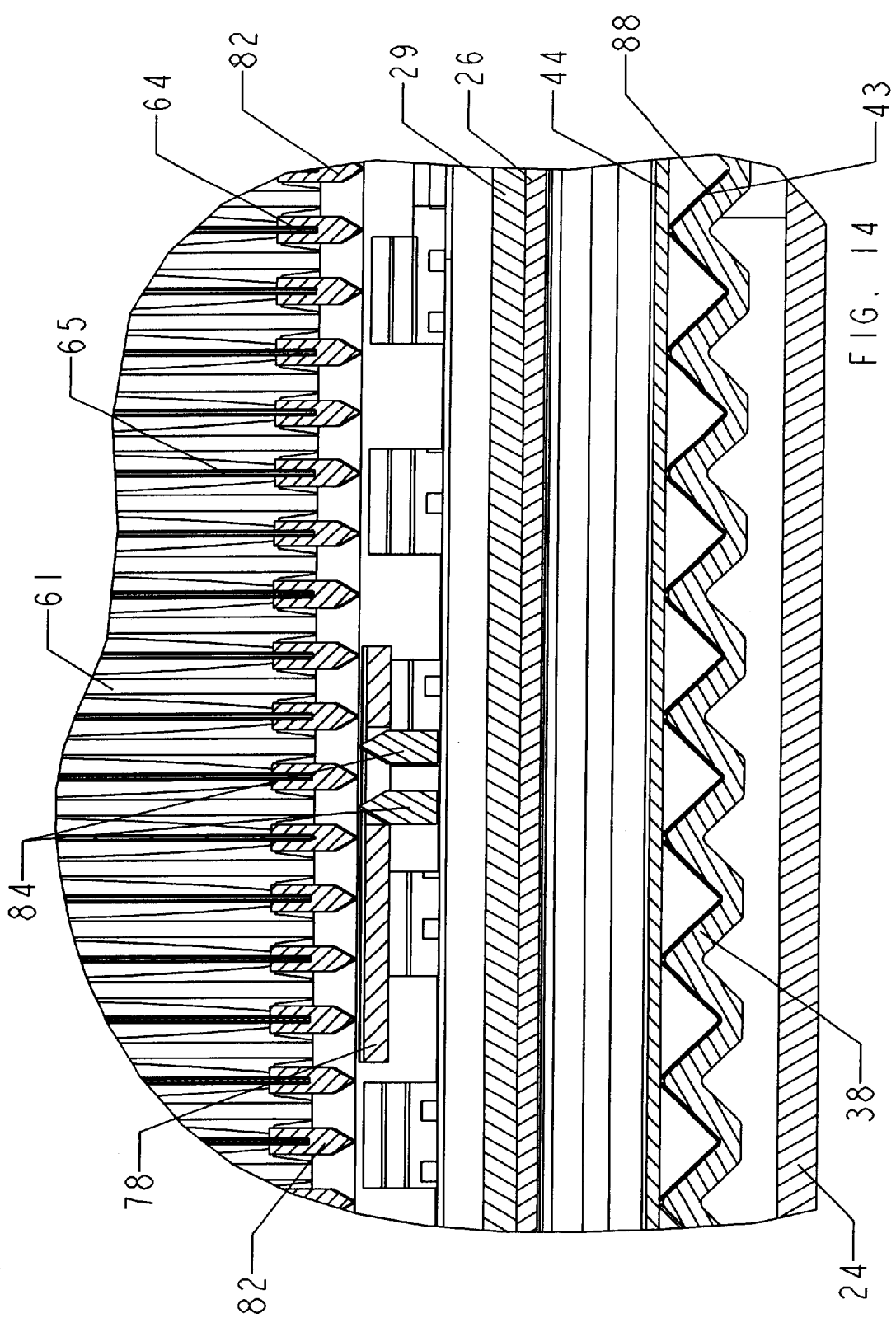
FIG. 14 is an enlarged, fragmentary view as taken generally line 14—14 of FIG. 12.
Figure 17:
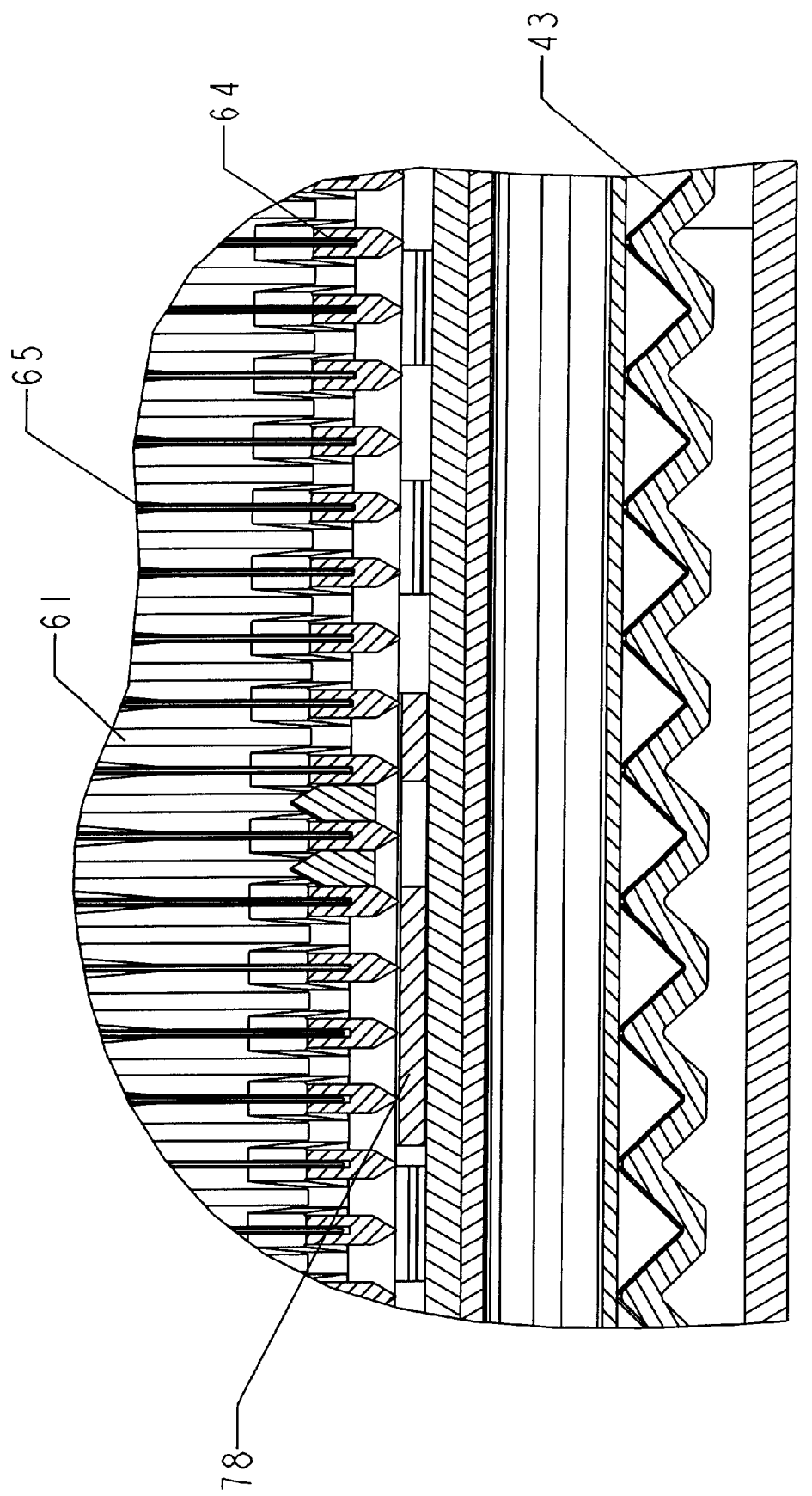
FIG. 17 is an enlarged fragmentary cross sectional view as taken generally on line 17—17 of FIG. 15.
Figure 18:
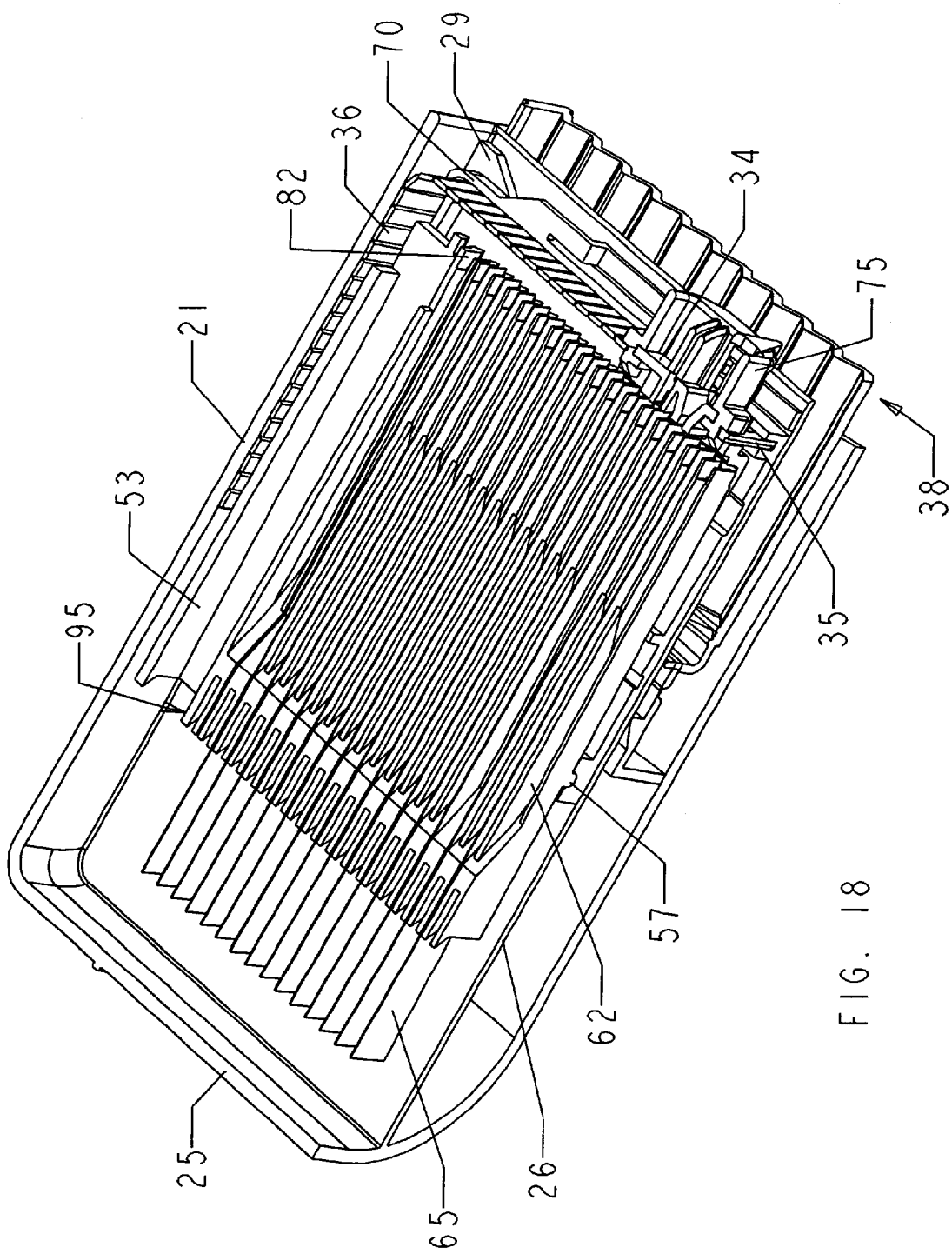
FIG. 18 is a fragmentary cross sectional perspective view as taken generally on line 18—18 of FIG. 8.
Figure 19:
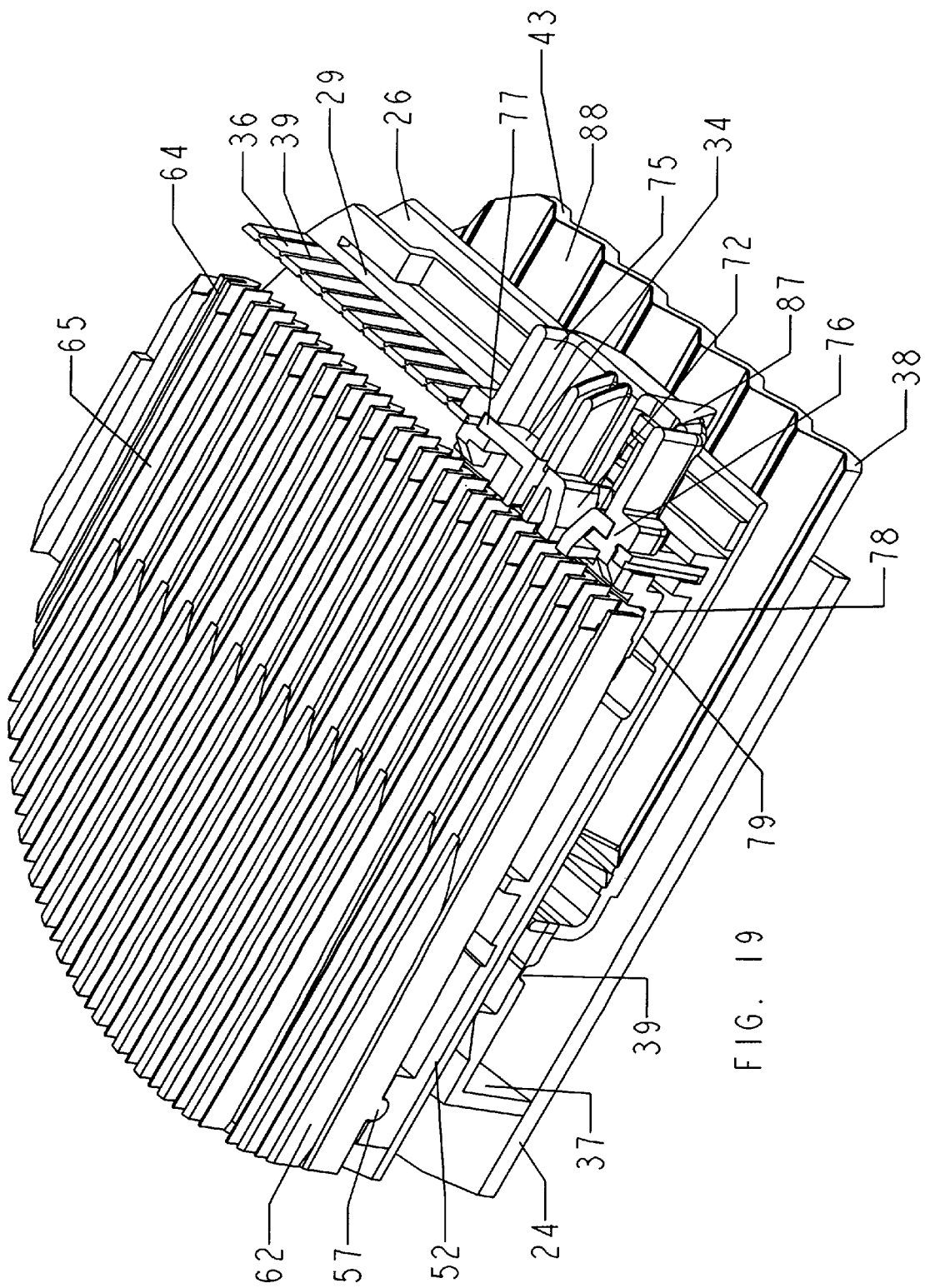
FIG. 19 is an enlarged fragmentary illustration of a portion of FIG. 18.

In order to move the portal 31 to the new position, the portal grip 75 is lifted with respect to the portal element 34, to a position as shown in FIG. 12. The tongue 78 of the portal grip elevates the forward edge of the inner housing bottom wall 52, causing the inner housing to tilt about its rearward support rib 57. This lifting action clears the projecting alignment lugs 82 of the inner housing above the alignment lugs 84 of the portal element, as shown in FIGS. 12–14. With the inner housing 50 in its lifted and substantially rearwardly tilted position, as shown in FIG. 12, side pressure applied to the portal grip 75 will move the portal element 34 laterally in either direction, as desired. In these lateral movements, the portal element also carries the shutter elements 35, 36 with it, so that the only opening at any time to the interior of the housings is via the respective portal slots 72, 73.

When the portal element 34 is approximately aligned at a desired disc groove 61, the portal grip 75 can be released. The tiltable inner housing 50 will thereupon return to its stable position, as shown in FIG. 8, supported on both of the ribs 56, 57. This will cause the alignment lugs 82 of the housing to return to a position interengaged with the portal alignment lugs 84, as shown in FIG. 10. It is only necessary to approximately align the portal element 34 at the desired location. Thereafter, when lifting pressure is released from the portal grip 75, the inner housing 50, under the offset weight of the housing and its contents, or with the assistance of suitable spring means (not shown), lowers into engagement with the portal alignment lugs 84. This displaces the lugs (and the entire portal element 34) to the left or to the right as necessary to effect precise alignment. If the inner housing is empty or only lightly loaded, the final alignment may, if necessary, be effected by applying a slight downward pressure to the pads 81 of the portal grip to return the inner housing 52 to its stable position.

A significantly advantageous feature of the present invention resides in the ability to achieve "direct indexing" of the portal element 34 by referencing an index pointer 87, at the bottom of the portal grip 75, to a title strip 88 mounted on one of the angular surfaces 43 of the corrugated inner surface 42 of the door panel 38. In this respect, the angular orientation of the surfaces 43 enables a separate title strip to be utilized for every disc position, even though the discs are stored on a lateral spacing which is significantly less than the width of the title strip. Although installed at an angle, the title strips are readily visible to and readable by the user, enabling the user to move the index pointer of the portal grip into alignment with a selected title strip. An approximate alignment is thus easily achieved, and a precise alignment thereafter is effected when the portal grip is released to allow the alignment lug elements 82, 84 to mesh and fix the portal in a precise position. In prior art systems, it has been customary to utilize indirect indexing, in which full title information is carried on a separate index card or the like, cross referenced to a position number in the storage device. The actual indexing to the desired disc is effected by reference to the number, but a two step operation is always required, whereas with the system of the invention, the initial cross referencing step required of the prior art is avoided.

In the rearwardly elevated position of the inner housing, as shown in FIG. 12, which may be referred to as the "move" position, the rearwardly projecting back portions of the various tray cards 65 come into engagement with the forwardly projecting abutment flange 27. This causes all of the tray cards to be displaced forwardly, relative to the inner housing, to a retrieve position, enabling a selected tray card to be retrieved through the slot 73 in the portal element, when desired. The displacement and alignment of the tray cards occurs automatically, whenever the housing is lifted for movement of the portal element 34 to a selected position. When the portal grip 75 is released, returning the housing to its stable position shown in FIG. 8, the upper leading portion of a selected tray card 65, which is aligned with the projection 74, will slightly enter the rearwardly divergent portion of the card slot 73, as shown at the upper forward portion of FIG. 8.

Having selected a particular disc, by lateral positioning of the portal element 34, that disc may be retrieved from the inner housing 50 by pressing downward on one or both of the pads 81 of the portal grip 75, displacing the tiltable inner housing 50 to a forwardly tilted position as shown in FIG. 15. With the housing thus tilted, all of the discs move forward and will tend to roll forward by gravity. However, because of the presence of the portal element and the associated shutter elements 35, 36, all of the discs except for the selected disc are stopped after a very short movement.

To advantage, the portal element is provided with upper and lower disc restraining pads 89, 89a, which project forward of the main body of the portal element and resiliently engage the outer periphery 62b of a selected disc 62a (FIG. 15). The vertical distance between the upper and lower restraining pads 89, 89a is accurately spaced to be just slightly less than the full diameter of the disc. Accordingly, the disc will be allowed to roll forwardly to a position in which disc is approximately half-way through the slot 72 in the portal element, with its center hole 90 exposed and accessible, before the disc is decelerated and stopped. This enables the disc to be engaged by insertion of a finger into its center hole 90 and engagement of the outer periphery 62b with a second finger, such that the sensitive data surface of the disc never has to be touched.

As will be evident by comparison of FIGS. 8 and 15, when the inner housing 50 is tilted forwardly to its retrieval position, it pivots about the forward support rib 56. Overall, the housing tilts approximately five degrees, from its two degree rearward tilt to a three degree forward tilt. Since the pivot axis is at the level of the support rib 56, the tilting action of the housing moves all of the discs forward a considerable distance, approximately 5.6 mm, without any rolling action of the discs. This brings all of the discs to a position close to the shutters 35, 36, in the illustrated embodiment to within about 2.4 mm. Accordingly, when the discs begin to roll forwardly as a result of the forward tilt of the inner housing, the non-selected discs will only roll the remaining 2.4 mm, before contacting and being restrained by the inner surfaces of the shutters. Thus, there is minimal opportunity for the non-selected discs to gain any significant forward momentum before their movement is arrested. In this respect, the shutters serve a very desirable and important function of maintaining the outer housing closed to the ambient. However, a function of even greater importance lies in restricting the extent of forward movement of non-selected discs and cards when the internal housing is tilted to its "retrieve" position. For some applications, it may be acceptable to provide, instead of full height shutters, flexible or elastic restraining means that are associated with the portal element and extend across the front of the outer housing in all positions of the portal element. The restraining means, in this alternative version, would serve to limit forward movement of the non-selected discs without necessarily closing off the front of the housing.

Figure 3:
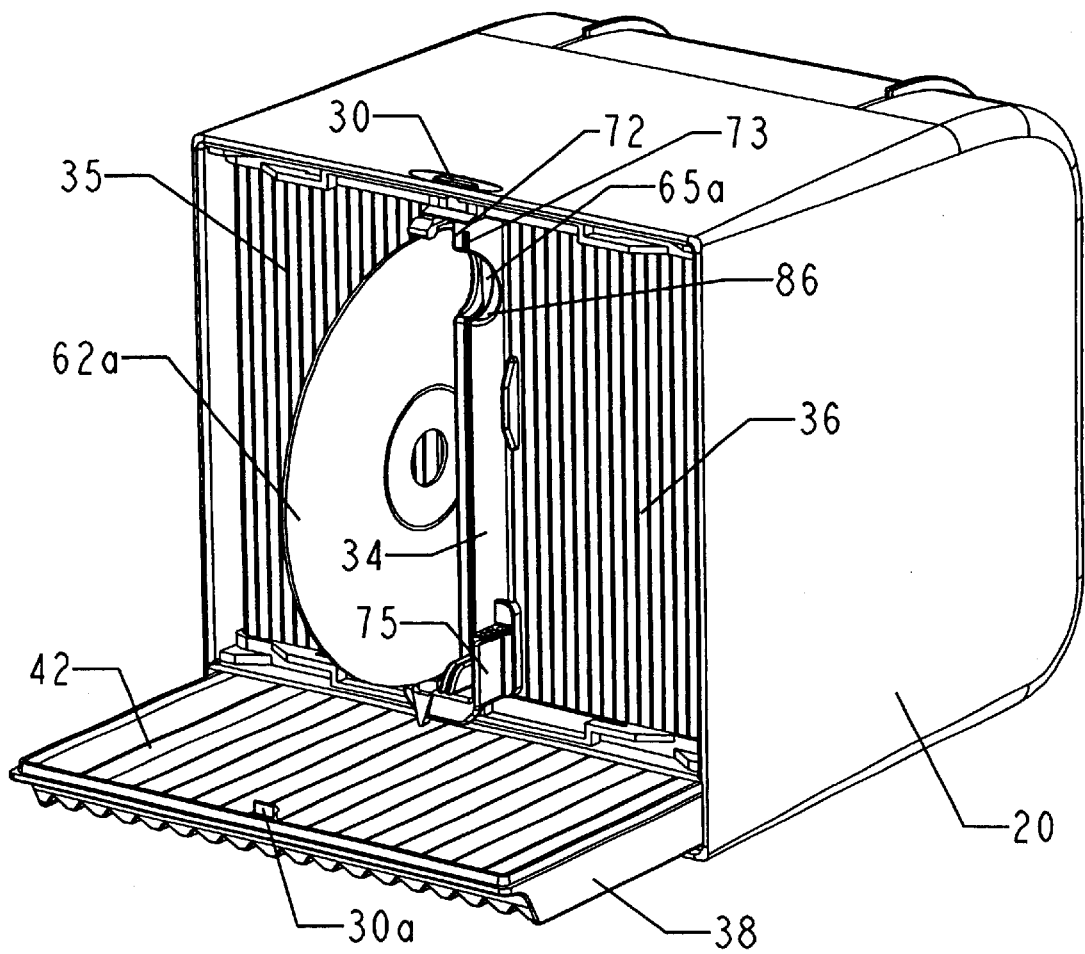
FIG. 3 is a perspective view, similar to FIG. 2, showing the unit with the access door open and a selected disc in a position ready for retrieval.

During the forward tilting of the inner housing 50 to the retrieval position, the various tray cards are also brought forward with the forward movement of the housing. The selected tray card 65a (FIG. 3) enters the back of the card slot 73 and a portion of it becomes visible and accessible within the recess 86 in the upper portion of the portal element 34. The remaining, non-selected cards engage the back surfaces of the shutters 35, 36 and/or back surface portions of the portal element, and are in effect pushed backward in their confining slots in the internal housing. The selected tray card 65 may be removed, if desired. On the next occasion for moving the portal element 34, the infernal housing 50 is tilted rearwardly, to its FIG. 12 position, at which time all of the fray cards 65 are again reset to potential retrieval positions by engagement of their back edges with the abutment flange 27, as previously described.

Mounting of the internal housing 50 by means of two, spaced-apart support ribs 56, 57 has certain advantages with respect to the inherent stability of the housing 50 when in its "load" position and with respect to the motion of the internal housing when tilted forwardly or rearwardly. However, if will be understood that the housing may be supported for movement about a single pivot axis when desirable or expedient.

To advantage, the upper wall 51 of the tiltable housing is provided along its forward edge with spaced, forwardly projecting alignment lugs 91 which cooperate with one or more alignment elements 92 extending downward from a rearwardly projecting alignment arm 93 forming an integral part of the portal element 34. Whenever the tiltable internal housing 50 is in its rest position (FIG. 8) or its retrieval position (FIG. 15) there is meshing engagement between the respective alignment lugs 91, 92, to maintain precise alignment of the upper portion of the portal element 34, in the same manner as the lower portion. While it is preferred to align the portal element at both top and bottom, it may be sufficient to provide a single alignment means at the top or bottom.

In the illustrated form of the invention, the tiltable inner housing is provided with inner side walls 94, 95 spaced inward from the outer side walls of the housing to form side chambers 96, 97. These chambers may be used for various purposes, among which would be to retain small booklets that are sometimes included with CDs. Access to the side chambers 96, 97 involves detachment of the appropriate shutter 35 or 36 from the portal element 34 and sliding the shutter to a fully retracted position to expose the front opening of the chamber.

The system of the invention, while being of a relatively simplified and inexpensive construction, suitable to be formed entirely of molded plastic parts, provides an exceptionally versatile and sophisticated facility for the storage of CDs, DVDs and similar disc items, as well as cards, photos, etc. The system accommodates an extremely compact storage arrangement both in terms of lateral space requirements and front to back space requirements. The arrangement of the slidable portal element and attached flexible shutters enables the stored discs to be substantially isolated from the ambient during normal usage, while discs are being stored and retrieved. When not in active use, the front door panel is closed such that the container is effectively sealed. Moreover, when the door panel is closed, the unit blends in with typical home decor. For users having extensive collections of discs, the storage units according to the invention can be easily arranged in side-by-side multiples, stacked vertically, or both. The unit is also suitable for wall mounting, using normally closed screw holes (not shown) in the back wall of the housing.

The basic principles of the present invention are applicable to a wide variety of storage requirements. Discs of various kinds can be stored, such as, by way of example and not of limitation, music CDs, video DVDs, game CDs and DVDs, software discs, and the like. The system of the invention is also applicable to the storage of non-round objects, such as photos and floppy discs, for example. For almost any of these purposes, the direct indexing features of the present invention would be applicable and highly beneficial.

For the storage of discs, the system of the present invention is exceptionally advantageous. The discs are closely confined in a relatively small volume of space, and are effectively isolated from ambient contaminants, such as airborne dust, by limiting openings into the storage area to narrow access slots in the sliding portal element. While being stored, the discs are engaged only by edge extremities, areas free of recorded data. The operations involved in storage and retrieval do not require the discs to be touched in any of its sensitive recorded areas. In all cases, the disc can be engaged by two fingers, one through its center opening and another engaging its outer peripheral extremity.

For particularly compact storage of discs, the slots for receiving tray cards can be eliminated and replaced by disc-receiving grooves or slots, allowing a greatly increased number of discs to be stored in a given lateral space. Where this option is employed, it may also be advantageous to modify the inside structure of the door to provide for two layers of index panels, one slidable over the other, with title strip sections in each. Such an arrangement will accommodate direct indexing to the greater number of stored discs while permitting the title strip sections to be of sufficient width for viewing by the user.

For all its many advantages, the storage device of the invention can be economically manufactured by plastic injection molding processes, and quickly and efficiently assembled with a minimum labor involvement.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A system for the storage and retrieval of discs and the like, which comprises (a) an outer housing having an open front side, (b) an inner housing received within said outer housing and mounted therein for limited tilting movement, (c) said inner housing having a back and an open front, and having top and bottom walls, (d) said inner housing defining a plurality of grooves for the reception and storage of discs in a vertical orientation, (e) said inner housing being mounted in said outer housing for movement between a "load" position, in which said grooves have a rearward tilt to cause discs to roll toward the back thereof, and a "retrieval" position, in which said grooves have a forward tilt to cause discs to roll toward the open front of said housing, (f) a portal element mounted at the front of said outer housing and movable from side to side with respect thereto, (g) said portal element having a vertical slot therein for the passage of a disc during loading or retrieval thereof into or from said inner housing, and (h) movable restraining means connected to said portal element and movable therewith as said portal moves from side to side with respect to said outer housing, (i) said movable restraining means extending across the open front of said outer housing whereby, when said inner housing is tilted forwardly to said retrieval position, all discs in said inner housing are restrained except for a disc aligned with said vertical slot.

2. A system according to claim 1, wherein (a) said inner housing and said portal element are provided with interengaging alignment elements adapted for engagement when said inner housing is in at least one of said "load" and "retrieval" positions.

3. A system according to claim 2, wherein (a) said interengaging alignment elements are provided on said housing and said portal element whereby said alignment elements are engaged when said inner housing is in either of said "load" of "retrieval" positions, and (b) said inner housing is mounted in said outer housing for further tilting movement to a "move" position in which a forward portion of said inner housing is raised to disengage said alignment elements to enable lateral movement of said portal element.

4. A system according to claim 1, wherein (a) said movable restraining means comprises flexible shutter elements connected to said portal element at opposite sides thereof, (b) said shutter elements and said portal element serving to substantially close the open front of said outer housing in any position of said portal element.

5. A system according to claim 4, wherein (a) said shutter elements are of molded plastic construction and comprise a plurality of relatively narrow, vertical slats joined by integral, living hinge connections.

6. A system according to claim 1, wherein (a) a front closure door is associated with said outer housing and movable between a first position, closing the open front of said outer housing, and a second position projecting generally horizontally outward from the front of said outer housing, (b) said closure door having an inner panel defining a plurality of individual strip-like surface areas, extending vertically when the door is in said first position and horizontally outward when said door is in said second position, for the reception of indexing information corresponding to individual disc storage positions of said inner housing.

7. A system according to claim 6 wherein (a) said closure door has a principal plane, (b) alternate ones of said strip-like surface areas are disposed at an angle to each other and to said principal plane, whereby said inner panel has a generally corrugated surface contour, (c) said individual strip-like surface area providing mounting surfaces for title strips associated with said discs.

8. A system according to claim 6, wherein (a) said outer housing includes a bottom wall and a platform wall positioned above said bottom wall and defining a door space open at the front, (b) said closure door is joined with a hinge base member, said hinge base member being slidably received in said door space, (c) said closure door being hingedly connected to said hinge base member, (d) said closure door being adapted for partial reception in said door space when said door is in said second position, whereby said door is supported in a horizontal orientation, projecting outwardly from said outer housing.

9. A system according to claim 1, wherein (a) said inner housing is supported in said outer housing by spaced apart front and back support elements, and (b) said inner housing is tiltable rearwardly about said back support element and is tiltable forwardly about said front support element.

10. A system according to claim 9, wherein (a) said inner housing, when supported by both of said front and back support elements, is in a "load" position in which said grooves have a rearward tilt, (b) said inner housing, when rearwardly tilted to a position supported only by said back support element, is in a "move" position enabling lateral movement of said portal element, and (c) said inner housing, when forwardly tilted to a position supported only by said front support element, is in a "retrieve" position enabling a selected disc, aligned with said vertical slot, to move through said slot by gravity and be exposed for removal.

11. A system according to claim 10, wherein (a) said portal element is provided with forwardly extending disc restraining elements adjacent upper and lower portions of said vertical slot, (b) said restraining elements being spaced apart a distance slightly less than the diameter of a disc, whereby to decelerate and restrain said selected disc with approximately half of said disc projecting from said portal element.

12. A system according to claim 1, wherein (a) a movable grip element is movably positioned with respect to said outer housing and engageable with said inner housing, (b) said movable grip element having a manually engageable portion accessible externally of said outer housing for controllably tilting said inner housing.

13. A system according to claim 12, wherein (a) said movable grip element is mounted on said portal element for vertical movement with respect thereto, (b) said movable grip element having a portion extending into slidable engagement with front portions of said inner housing for effecting tilting movements of said inner housing upon vertical movement of said grip element.

14. A system according to claim 1, wherein (a) a portal grip element is slidably mounted on lower portions of said portal element for vertical movement with respect to said portal element and lateral movement with said portal element, (b) said portal grip element having a rearwardly projecting element engaging forward edge portions of said inner housing in any lateral position of said portal element for effecting tilting movements of said inner housing.

15. A system according to claim 14, wherein (a) said inner housing has a bottom wall, and a forwardly facing, laterally extending groove is formed on said bottom wall, (b) said rearwardly projecting element of said portal grip slidably engaging said laterally extending groove.

16. A system according to claim 1, wherein
(a) said grooves are formed in upper and lower pairs defined by a plurality of ribs formed on the top and bottom walls of said inner housing,
(b) said ribs having a tapered cross section such that said grooves are wider at open sides thereof than at closed sides thereof, such that said discs have minimum contact with side walls of said ribs.

17. A system according to claim 1, wherein
(a) said grooves are defined by a plurality of ribs formed on the top and bottom walls of said inner housing,
(b) said ribs having card slots extending along the length of thereof for the slidable reception of tray cards or the like, and
(c) said portal element having a second vertical slot therein, spaced from and parallel to the first mentioned slot, for the loading and retrieval of tray cards into and from said card slots.

18. A system according to claim 17, wherein
(a) the back wall of said inner housing is formed with vertical slots therein, aligned with said card slots for the reception of back edge portions of said tray cards.

19. A system according to claim 18, wherein
(a) an abutment flange projects forwardly from the back wall of said outer housing,
(b) said inner housing having a "move" position with greater rearward tilt than said "load" position,
(c) said abutment flange being adapted, when said inner housing is tilted rearwardly toward said "move" position, to engage back edges of tray cards projecting rearwardly through said back wall, to move said tray cards to a predetermined position in said inner housing for effecting retrieval of a selected one of said tray cards, when said housing is thereafter tilted to a "retrieve" position.

20. A system for the storage and retrieval of thin articles, which comprises
(a) a tiltable housing provided with a plurality of grooves extending from a front toward a back of said tiltable housing for the reception of said thin articles in a vertical orientation,
(b) said grooves having front and back ends and being substantially unrestricted at the front ends thereof,
(c) said tiltable housing having at least two tilt positions including a forward tilt or "retrieval" position in which said thin articles can be accessed for retrieval and rearward tilt or "load" position in which said thin articles are inaccessible,
(d) a portal element positioned at a front side of said tiltable housing and movable laterally with respect to said grooves into selective alignment with a desired groove,
(e) said portal element defining an opening adapted for alignment with said desired groove, whereby a thin article may be guided through said opening for loading into or retrieval from said desired groove, and
(f) a movable restraint carried by said portal element and movable with said portal element during lateral movements thereof to form a barrier to limit forward movement of thin articles positioned in said grooves but not aligned with an opening in said portal element.

21. A system according to claim 20, which includes
(a) an outer housing having top, bottom, back and side walls and being open at the front thereof,
(b) said tiltable housing being tiltably mounted within said outer housing,
(c) said movable restraint comprising first and second movable shutter elements connected to said portal element and movable therewith,
(d) said flexible shutter elements being slidably movable in said outer housing and serving to substantially close the open front of said housing.

22. A system according to claim 20, wherein
(a) said thin articles are discs,
(b) said portal element being formed with upper and lower restraining tabs positioned respectively above and below said vertically elongated opening for engagement with outermost edges of a disc moving through said opening when said tiltable housing is in said "retrieval" position, serving to decelerate and stop forward movement of said disc when approximately half of said disc, including a center opening thereof, is exposed for engagement and removal of said disc.

23. A system according to claim 20, wherein
(a) said thin articles comprise optically readable discs and associated tray cards,
(b) alternate grooves in said tiltable housing being adapted for the reception, respectively, of discs and tray cards,
(c) said portal element defining first and second vertically elongated openings positioned in side by side relation and adapted for the passage, respectively, of discs and tray cards,
(d) said vertically elongated openings being so spaced apart laterally, in relation to the spacing of said grooves, that when said first opening is aligned with a selected groove holding a disc, said second opening is aligned with a tray card associated with said disc.

24. A system according to claim 23, wherein
(a) said tray cards are spaced laterally from discs associated therewith by an amount greater than the spacing between adjacent grooves.

25. A system according to claim 20, wherein
(a) said tiltable housing is supported by spaced apart front and back support elements,
(b) means are provided for tilting said housing rearwardly about said back support element and forwardly about said front support element,
(c) said tiltable housing being held in a stable position when supported by said front and back support elements simultaneously.

26. A system according to claim 21, wherein
(a) a door is hingedly associated with said outer housing for pivotal movement between a generally vertical position, closing the front of said outer housing, and a generally horizontal position, extending outward from the front of said outer housing,
(b) said door having an inner panel of corrugated configuration, defining a plurality of strip-like surface areas for the mounting to title strips associated with said thin articles.

* * * * *